(12) United States Patent
Bardon et al.

(10) Patent No.: US 8,398,736 B2
(45) Date of Patent: Mar. 19, 2013

(54) CEMENT FOR PARTICLE FILTER

(75) Inventors: Sébastien Bardon, Cambridge, MA (US); Anthony Briot, Avignon (FR); Gaëtan Champagne, Isle sur Sorgue (FR); Vincent Gleize, Avignon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 517 days.

(21) Appl. No.: 12/304,146

(22) PCT Filed: Jun. 19, 2007

(86) PCT No.: PCT/FR2007/051458
§ 371 (c)(1),
(2), (4) Date: Jul. 2, 2009

(87) PCT Pub. No.: WO2007/148010
PCT Pub. Date: Dec. 27, 2007

(65) Prior Publication Data
US 2009/0320427 A1    Dec. 31, 2009

(30) Foreign Application Priority Data
Jun. 19, 2006  (FR) .................................... 06 05436

(51) Int. Cl.
  *B01D 39/14* (2006.01)
  *B01D 39/06* (2006.01)
  *B01D 39/00* (2006.01)
  *B01D 50/00* (2006.01)
  *F01N 3/00* (2006.01)
  *B01J 23/00* (2006.01)
  *B01J 23/10* (2006.01)
  *B32B 3/12* (2006.01)

(52) U.S. Cl. .............. 55/523; 55/522; 55/524; 422/169; 422/170; 422/171; 422/172; 422/177; 422/178; 422/179; 422/180; 422/181; 422/182; 60/297; 502/303; 428/117

(58) Field of Classification Search ........... 55/522–524; 422/169–172, 177–182; 60/297; 502/303; 428/117
See application file for complete search history.

(56) References Cited

U.S. PATENT DOCUMENTS

| | | | |
|---|---|---|---|
| 2004/0045267 | A1 | 3/2004 | Ichikawa |
| 2005/0011174 | A1* | 1/2005 | Hong et al. ............... 55/523 |
| 2005/0109023 | A1* | 5/2005 | Kudo et al. ............... 60/311 |
| 2005/0247038 | A1* | 11/2005 | Takahashi ............... 55/523 |
| 2006/0154021 | A1* | 7/2006 | Ohno et al. ............... 428/116 |
| 2007/0126160 | A1* | 6/2007 | Takahashi ............... 264/628 |
| 2009/0035512 | A1 | 2/2009 | Masukawa et al. |

FOREIGN PATENT DOCUMENTS

| | | |
|---|---|---|
| EP | 0 357 491 | 3/1990 |
| EP | 0356800 | 3/1990 |
| EP | 0361238 | 4/1990 |
| EP | 0816065 | 1/1998 |
| EP | 1 142 619 | 10/2001 |
| EP | 1 316 686 | 6/2003 |
| EP | 1 479 881 | 11/2004 |
| EP | 2006266 A1 | 12/2008 |
| WO | WO2005045210 * | 5/2005 |
| WO | 2007111281 A1 | 10/2007 |

OTHER PUBLICATIONS

International Search Report dated Feb. 6, 2008, in PCT application.
Japanese Office Action, dated Oct. 24, 2011, in Application No. 2009-515927.

* cited by examiner

*Primary Examiner* — Amber Orlando
(74) *Attorney, Agent, or Firm* — Young & Thompson

(57) ABSTRACT

Jointing cement intended in particular for fastening together a plurality of filter blocks of a filtering body of an exhaust gas particle filter of an internal combustion engine of a motor vehicle, having a silicon carbide (SiC) content of between 30% and 90%. The cement according to the invention includes at least 0.05% and less than 5% of a thermosetting resin, the percentages being percentages by weight relative to the total weight of the thermosetting resin and the mineral material, apart from the possible water.

9 Claims, 1 Drawing Sheet

CEMENT FOR PARTICLE FILTER

FIELD OF THE INVENTION

The invention concerns a cement, in particular a jointing cement intended for fastening together a plurality of filter blocks of a filtering body, in particular for an exhaust gas particle filter of an internal combustion engine of a motor vehicle, and in particular a cement intended to constitute a peripheral coating of the side surface of such a filtering body. The invention also concerns a filtering body comprising a plurality of filter blocks fastened together by means of a joint inserted between said filter blocks and shaped so as to oppose to the passage of said exhaust gases between said filter blocks, wherein the joint is obtained by the hardening of a cement according to the invention.

BACKGROUND OF THE INVENTION

Before being evacuated into the atmosphere, the exhaust gases can be purified by means of a particle filter such as that represented on FIGS. 1 and 2, known from the prior art. Identical references were used on the various figures to indicate identical or similar components.

SUMMARY OF THE INVENTION

A particle filter 1 is represented on FIG. 1 in a cross-sectional view, according to the sectional plane B-B represented on FIG. 2, and, on FIG. 2, in a longitudinal cross-sectional view according to the sectional plane A-A represented on FIG. 1.

The particle filter 1 classically comprises at least one filtering body 3, having a length L, inserted in a metal envelope 5.

The filtering body 3 can be monolithic. To improve its thermomechanical resistance, in particular during the regeneration phases, however, it proved to be advantageous that it results from the assembly and the machining of a plurality of blocks 11, referenced 11a-11i.

To manufacture a block 11, a ceramic material is extruded (cordierite, silicon carbide, . . . ) so as to form a porous honeycomb structure. The extruded porous structure is classically rectangular parallelepiped shaped and extends between two substantially square upstream 12 and downstream 13 faces, on which a plurality of adjacent, rectilinear and parallel channels 14 open.

After extrusion, the extruded porous structures are alternatively blocked on the upstream 12 face or the downstream 13 face by upstream 15s and downstream 15e plugs, respectively, as is well known, to form channels of "outlet channels" 14s and "inlet channels" 14e type, respectively. At the end of the outlet 14s and inlet 14e channels opposite to the upstream 15s and downstream 15e plugs, respectively, the outlet 14s and inlet 14e channels open up outwards through outlet 19s and inlet 19e openings, respectively, extending on the downstream 13 and upstream 12 faces, respectively. The inlet 14s and outlet 14e channels thus define the internal spaces 20e and 20s, delimited by a side wall 22e and 22s, a sealing plug 15e and 15s, and an opening 19s or 19e opening outwards, respectively. Two adjacent inlet 14e and outlet channels 14s are in fluid communication by the common portion of their side walls 22e and 22s.

The blocks 11a-11i are assembled together by joining by means of joints 27 made from ceramic cement, generally constituted of silica and/or silicon carbide and/or aluminum nitride. The assembly thus constituted can then be machined to take, for example, a round section. Preferably, a peripheral coating 27' is also applied so as to substantially cover all the side surface of the filtering body.

The result is a cylindrical filtering body 3 having a longitudinal axis C-C, which can be inserted in the case 5, a peripheral joint 28, exhaust gas-tight, being seated between the external filter blocks 11a-11 hand the case 5.

As the arrows represented on FIG. 2 indicate, the exhaust gas stream F enters the filtering body 3 through the openings 19e of the inlet channels 14e, crosses the filtering side walls of these channels to join the outlet channels 14s, then escapes outwards through the openings 19s.

After a certain time of use, the particles, or "soot", accumulated in the channels of the filtering body 3 increase the pressure loss due to the filtering body 3, and thus deteriorate the performances of the engine. For this reason, the filtering body must be regularly regenerated, for example every 500 kilometers.

Regeneration, or "declogging", consists in oxidizing soot. To do this, it is necessary to heat it to a temperature allowing ignition. The inhomogeneity of the temperatures within the filtering body 3 and the possible differences in nature of materials used for the filter blocks 11a-11i and joints 27 and 28, can then generate strong thermomechanical stresses, capable of causing cracks in the joints and/or in the filter blocks 11a-11i, decreasing the service life of the particle filter 1.

The material of the joints 27 and 28 must thus have a good mechanical resistance at low temperatures, i.e. between 400 and 500° C., and at high temperatures, i.e. at temperatures greater than 1,100° C.

One knows in particular jointing cements comprising between 30 and 60% of silicon carbide in weight. The silicon carbide has a high thermal conductivity, advantageously making it possible to homogenize the thermal transfers. The silicon carbide however, has a relatively high dilation coefficient. The silicon carbide content of these jointing cements must thus be limited to ensure a thermomechanical resistance which is adapted to the particle filters application.

In addition, to improve the elasticity of the joint obtained by the hardening of the jointing cement, and thus the thermomechanical strength of the assembled filtering body, as well as the adhesion of the joint cement to the walls of the filter blocks, incorporating ceramic fibers into the assembly cement is also known, for example from EP 0,816,065, (compare for example references 1 and 2 of table 1 below). The silicon carbide content in the cement is between 3 and 80% in weight. However, the presence of ceramic fibers represents a potential risk in terms of hygiene and safety and makes recycling the filtering body more difficult. The use of biosoluble fibers could limit this risk. The effect of the latter on the resistance to thermomechanical stresses, in particular at a high temperature, is however weak. Moreover, the incorporation of fibers, in particular of shot (infibrous particles), is particularly expensive.

EP 1,479,881 reveals a jointing cement comprising resin quantities largely greater than 5%, with the object of adjusting the porosity. The high quantities of thermosetting resin however provide the wet cement with a consistency which, under the industrial conditions of use, prevents regular spreading out, and thus a homogeneous distribution of cement between the filter blocks. The filtering body obtained by assembly of filter blocks by means of such a cement consequently has insufficient mechanical strength for the canning operation, i.e. implementation of the filtering body in the exhaust line. In addition, the high contents of thermosetting resin lead to the appearance of cracks during drying, debinding or curing operations. Lastly, these resins generally generate products which are harmful for the environment during debinding, and high quantities of resin make it difficult to control these harmful products under industrial conditions.

The object of the present invention is to provide a cement capable of producing a new joint material presenting an improved adhesion, or having a satisfactory thermomechanical strength but without ceramic fibers and/or with a high silicon carbide content.

According to the invention, this objective is reached by means of a cement, in particular a jointing cement, intended in particular for fastening together a plurality of filter blocks of a filtering body, of an exhaust gas particle filter of an internal combustion engine of a motor vehicle, and in particular a cement intended to be used as a peripheral coating for such a filtering body, the cement according to the invention comprising a silicon carbide (SiC) content of between 30 and 90%, this cement being remarkable in that it comprises at least 0.05%, preferably at least 0.1%, preferably still at least 0.2%, and less than 5%, preferably less than 1%, preferably still less than 0.5% of a thermosetting resin, the percentages being percentages by weight relative to the total weight of the thermosetting resin and the mineral material (thus including silicon carbide), apart from the possible water.

DETAILED DESCRIPTION OF THE INVENTION

Figure 1:
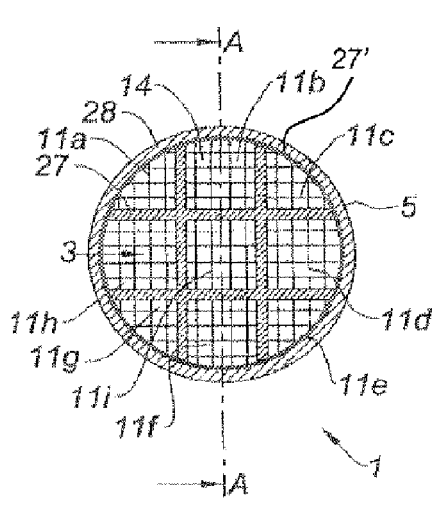
FIG. 1 depicts a particle filter 1 in a cross-sectional view, known from the priot art.
Figure 2:
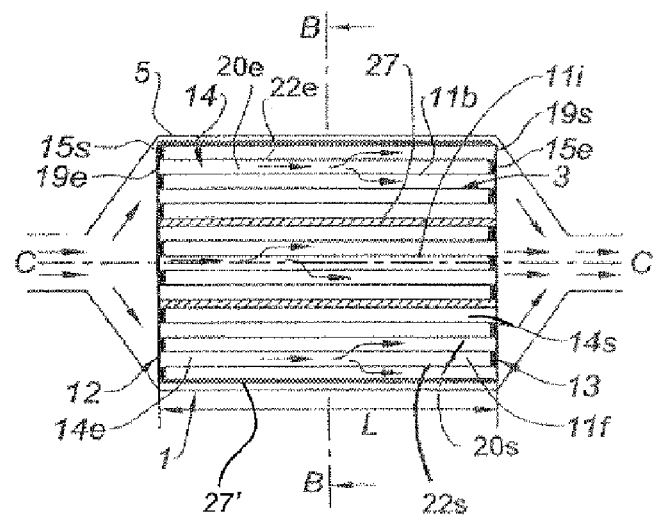
FIG. 2 depicts the particle filter 1 in a longitudinal cross-sectional view according to the sectional plane A-A shown in FIG. 1, known from the prior art.

As one will see more in detail hereafter, the presence of thermosetting resin improves the adhesion of the joint, while preserving its mechanical strength, in particular when cold. The longevity of the joint in its application to the jointing of filter blocks is thus increased. Furthermore, this improvement of the mechanical strength makes it possible to do without the presence of ceramic fibers and/or to increase the silicon carbide content.

In a surprising way, the inventors also noted that a thermosetting resin content lower than 5% authorizes, under industrial conditions of use, a regular spreading out, and thus a very homogeneous distribution of the cement between the filter blocks. They also observed that the number of cracks appearing during heat treatment operations is reduced. Advantageously, the mechanical strength of the filtering body is improved, which facilitates the canning operation.

Lastly, the low resin content facilitates the control of the harmful products generated under industrial conditions.

Preferably, the jointing cement according to the invention further comprises one or more of the following optional characteristics:

The thermosetting resin is selected among epoxy, silicone, polyimide, phenolic and polyester resins.

The cement comprises more than 60% of silicon carbide, in percentage by weight relative to the total weight of the thermosetting resin and the mineral material, apart from the possible water.

The cement does not contain ceramic fibers.

The cement does not comprise clay.

The cement comprises between 0.1 and 2%, preferably between 0.1 and 0.5% of a dispersant, in percentages by weight relative to the total weight of the thermosetting resin and the mineral material, apart from the possible water.

The cement has a CaO content of less than 0.5%, in percentage by weight relative to the total weight of the thermosetting resin and the mineral material, apart from the possible water.

Preferably, after humidification, the wet cement, or "mortar", has a water content of less than 40%, preferably less than 30% and/or at least 10%, preferably at least 15%, in percentages by weight relative to the total weight of the thermosetting resin and the mineral weight, apart from the water.

The cement has an alumina content, preferably calcined, of between 5 and 25%, preferably between 10 and 25%, and/or a silica content, preferably in the form of silica smoke, of between 1 and 15%, preferably between 3 and 10%, in percentages by weight relative to the total weight of the thermosetting resin and the mineral material, apart from the possible water.

The silicon carbide, alumina and silica represent at least 80%, preferably at least 95%, preferably still at least 99.5% of the total weight of the thermosetting resin and the mineral material, apart from the possible water.

The invention also relates to a filtering body, in particular for an exhaust gas particle filter of an internal combustion engine of a motor vehicle, comprising a plurality of filter blocks fastened together by means of at least one joint inserted between said filter blocks and shaped so as to oppose the passage of said exhaust gases between said filter blocks. This filter body is remarkable in that the joint is obtained by the hardening of the cement according to the invention.

Finally, the invention concerns a filtering body, in particular for an exhaust gas particle filter of an internal combustion engine of a motor vehicle, a single block or comprising a plurality of filter blocks fastened together by means of at least one joint inserted between said filter blocks. This filtering body is remarkable in that it comprises a peripheral coating obtained from a cement according to the invention.

Preferably, the assembled filter blocks comprise at least 50% of silicon carbide.

"Thermosetting resin" means a polymer which can be transformed into an infusible and insoluble material after heat treatment (heat, radiation) or physicochemical treatment (catalysis, hardener). The thermosetting materials thus take their final form with the first hardening of the resin, the reversibility of which being impossible.

According to the applications, it can be advantageous that the resin hardens at ambient temperature, for example following the addition of a catalyst, at the drying temperature or at the heat treatment temperature.

Preferably, the thermosetting resin further presents a sticking character before its hardening. It thus facilitates the placing of the cement and its maintenance in shape before the heat treatment. Preferably, the resin has a viscosity of less than 50 Pa·s for a shearing gradient of 12 s$^{-1}$ measured with a Haake VT550 viscometer. Preferably, it must be water soluble at ambient temperature.

"Cement" means a "moldable" composition formed by a particle mixture, dry or wet, capable of solidifying. The cement can be "deactivated", i.e. in a stable moldable condition, or "activated", i.e. in the solidification process. The activated condition classically results from the mixture with water. The cement according to the invention can either be in an activated or deactivated condition, i.e. in particular comprising water or not. This is why its composition is defined in percentages by weight relative to the total weight of the mineral material and the thermosetting resin, without taking the water into account.

The thermosetting resin can be present in the cement according to the invention in powdery or liquid form, the powdery form being preferred.

Preferably, the cement comprises more than 60% of silicon carbide, in percentage by weight relative to the total weight of the thermosetting resin and the mineral material, apart from the possible water. Indeed, the thermosetting resin advantageously enables the silicon carbide content to be increased to a content greater than 60%, while preserving a satisfactory thermomechanical strength. The extraction of valuable metals during the recycling of the filtering body is thus facilitated. The re-use of silicon carbide is also simplified.

To facilitate recycling, it is also preferable that the cement does not contain ceramic fibers.

Cements not containing ceramic fibers and presenting high silicon carbide contents are known, in particular for the jointing of filtering bodies not containing ceramic fibers. These cements typically contain powder or grains of silicon carbide, a ceramic binder of CaO aluminate type for cold-setting, and a high temperature ceramic binding phase. However, these cements present a weaker refractoriness when hot because of the presence of CaO aluminate, which weakens the joint during extreme stress, in particular during a complete regeneration.

The presence of a thermosetting resin in the cement according to the invention advantageously makes it possible to limit the ceramic binder content for the cold-setting. The cement can thus have a CaO content of less than 0.5%, in percentage by weight relative to the total weight of the thermosetting resin and the mineral material, apart from the possible water. Preferably, the cement according to the invention does not comprise CaO. The weakening caused by CaO is thus advantageously limited.

The cement according to the invention can comprise clay, in particular a refractory clay of ball-clays, bentonite, even kaolin type. The clay is indeed classically added to increase the resistance of the joint after drying. It however implies high quantities of water in the cement, and thus an increase in the risk of cracking. The presence of thermosetting resin in the cement advantageously enables to reduce the quantity of clay, while guaranteeing an acceptable adhesion.

Preferably, the cement further comprises between 0.1 and 0.5% in weight of a dispersant, in percentage by weight relative to the total weight of the thermosetting resin and the mineral material, apart from the possible water. The dispersant can be for example selected among alkaline metal polyphosphates or methacrylate derivatives. All the known dispersants are possible, pure ionic, for example HMPNa, pure steric, for example of sodium polymethacrylate type, or a ionic and steric combined type. The addition of a dispersant makes it possible to better distribute the fine particles, with a size of less than 50 μm, and thus favours the mechanical resistance of the joint.

Preferably, the dispersant, or "deflocculating agent", is incorporated in the dry particle mixture in powder form.

In addition to the components mentioned above, the cement according to the invention can also comprise one or more shaping or sintering additives classically used, in the proportions well-known by one skilled in the art. As examples of additives which can be used, one can quote, in a non-restrictive way:

organic temporary binders (i.e. completely or partially eliminated during the heat treatment), such as resins, cellulose or lignone derivatives, such as carboxymethylcellulose, dextrin, polyvinyl alcohols, etc;

chemically binding agents, such as phosphoric acid, aluminum monophosphate, etc;

sintering promoters such as titanium dioxide or magnesium hydroxide;

shaping agents such as calcium or magnesium stearates.

A cement according to the invention is prepared according to conventional methods of cement manufacture.

In a first step, the particle materials are classically mixed until a homogeneous mixture is obtained. Preferably the thermosetting resin is incorporated in this stage in the form of a powder.

A catalyst of the resin intended to accelerate the solidification of the resin after activation of the cement, preferably in the form of a powder, can also be added at this first stage.

The mixture obtained can be conditioned and marketed. If this mixture comprises the thermosetting resin, it constitutes a deactivated cement according to the invention. Preferably, this mixture contains at least a portion of the various necessary powdery additives. A portion of the latter can however be added at the second step.

In the second step, water is added to the particle mixture. Preferably, one adds less than 40%, and/or at least 10%, preferably at least 15%, in percentage by weight relative to the total weight of the thermosetting resin and the mineral material, apart from the water.

The resin is preferably selected in order to dissolve in water to decrease its viscosity. Preferably, the resin is dissolved in water before this mixture is added to the particle mixture.

A catalyst of the resin, preferably in the powdery form, can be also added during this second step. The catalysts, for example furfurylic alcohol or urea, are adapted to each type of resin and well-known by one skilled in the art.

The wet mixture is then kneaded until a pasty cement is obtained. The water addition causes the activation of this cement according to the invention, i.e. begins its solidification process. This cement can then be inserted between the filter blocks of a filtering body or at the periphery of a filtering body.

Classically, after its placing between the filter blocks, the cement is dried at a temperature preferably between 100 and 200° C., preferably under air or a moisture-controlled atmosphere, preferably so that the residual moisture remains between 0 and 20%. Classically, the drying duration is between 15 minutes and 24 hours, depending on the format of the joint.

If the application requires, the cement is "thermally treated", i.e. cured, preferably in an oxidizing atmosphere, preferably at atmospheric pressure, at a temperature between 400° C. and 1200° C., so as to form a refractory joint. This heat treatment operation is well-known by one skilled in the art. The duration of the firing, generally approximately between 1 and 20 hours from cold to cold, is variable depending on the materials, but also on the size and the shape of the refractory joints to be manufactured.

During the heat treatment operation, the resin more or less breaks down depending on the temperature. The presence of residual resin after heat treatment improves the cohesion of the filtering body, including during the canning step. If the heat treatment temperature is greater than the breaking-down temperature of the resin, the resin content decreases, but a beginning of ceramming then enables to ensure the cohesion of the filtering body. The resin then advantageously acts like a "solidification relay".

Depending on the resin used, the hardening of the resin can be carried out at ambient temperature, at the preferable drying temperature, at the heat treatment temperature or can require radiation, for example with ultraviolet rays, or complementary heating.

The cement according to the invention proved not only adapted to fastening together filter blocks of a filtering body, intended for filtering exhaust gases of an internal combustion engine of a motor vehicle, but also to form the peripheral coating, classically placed on the peripheral side surface of the filtering bodies. Therefore, the invention also relates to the use of a cement according to the invention, to constitute the peripheral side coating of a filtering body, whether this one is a single block, i.e. not assembled, or on the contrary, constituted by the assembly of a plurality of filter blocks. The invention particularly concerns a filtering body comprising a plurality of filter blocks fastened together by means of a joint obtained from a cement according to the invention, and of which the peripheral side surface is covered with a coating obtained from the same cement.

The following examples, shown in table 1, are provided on a purely illustrative and non-restrictive basis.

The tested cements are prepared in a mixer of planetary, non-intensive type according to a traditional procedure, including:
- dry kneading, for 2 minutes, of the powders and grains with, if necessary, the dispersant, then
- an addition of water, possibly with a binder (polysaccharide) and, if necessary, a catalyst, then
- kneading for 10 minutes until a consistency sufficient for a jointing cement application is obtained.

References 1 and 2 ("Ref. 1" and "Ref. 2") are cements according to the prior art. Reference 2 corresponds to a fibrous cement as described in EP 0,816,065.

The top portion of table 1 provides the formulation of the dry particle mixtures used, in percentages. These percentages are percentages by weight relative to the weight of the mixture considered. The lower portion of table 1, under the line "Total", provides the additions to the dry mixtures to form the cements to be tested. In this lower portion, the percentages are expressed relative to the weight of the dry mixtures of the top portion.

TABLE 1

|  | Ref. 1 | Ref. 2 | 1 | 2 | 3 | 4 |
|---|---|---|---|---|---|---|
| Formulations of dry particle mixtures | | | | | | |
| SiC powder (median diameter: 0.3 µm) | 50 | | | | | |
| Silica-alumina fibers Length <100 µm; <5% shot | | 38.5 | | | | |
| Colloidal silica (to 30% of SiO$_2$) | | 11.5 | | | | |
| Granular mixture of silicon carbide. Sizes of between 0 and 0.5 mm SiC content >98% | 80.0 | | 82 | 85 | 88.0 | 70 |
| Clay at 40% of Al$_2$O$_3$ | | | | | | |
| Calcium alluminate (CA270 type) | 5.0 | | | 1.5 | | |
| Calcined alumina | 10.0 | | 13.0 | 9.5 | 8.0 | 20.0 |
| Silica smoke | 5.0 | | 5.0 | 4.0 | 4.0 | 10.0 |
| Total | 100 | 100 | 100 | 100 | 100 | 100 |
| Additives | | | | | | |
| Powdery epoxy resin | no | no | 0.2 | 0.2 | 0.3 | 0.2 |
| Polysaccharide: powdery methylcellulose derivatives | 0.5 | 0.5 | 0.2 | 0.2 | 0.2 | 0.2 |
| Powdery deflocculating | | | 0.3 | 0.3 | 0.3 | 0.3 |

TABLE 1-continued

|  | Ref. 1 | Ref. 2 | 1 | 2 | 3 | 4 |
|---|---|---|---|---|---|---|
| agent/dispersant | | | | | | |
| Resin catalyst | | | 0.8 | 0.8 | 1.5 | 0.8 |
| Water | 30 | 39 | 17 | 17 | 18 | 15 |
| Characterization | | | | | | |
| Adhesion test (kg/cm$^2$) | 2.5 | 3.5 | 3.8 | 3.7 | 3.6 | 4.1 |
| Calcined composition 750° C./0.5 Hours | | | | | | |
| SiC | 78 | 57.0 | 80 | 83.5 | 86 | 69 |
| Al$_2$O$_3$ | 12 | 15.0 | 13 | 10.5 | 8.5 | 20 |
| SiO$_2$ | 7.5 | 25.0 | 6 | 4.0 | 4.5 | 10 |
| CaO | 1.0 | <1% | | 1.0 | | |
| Other species, including impurities | 1.5 | <2% | 1.0 | 1.0 | 1.0 | 1.0 |

In an equivalent way, the following table 1' provides the composition of the particle mixtures 1 to 4 in percentages by weight relative to the total weight of the thermosetting resin and the mineral material, apart from water.

|  | 1 | 2 | 3 | 4 |
|---|---|---|---|---|
| Granular mixture of silicon carbide. Sizes of between 0 and 0.5 mm. SiC content >98% | 81.8 | 84.8 | 87.7 | 69.9 |
| Clay at 40% of Al$_2$O$_3$ | | | | |
| Calcium aluminate (CA270 type) | | 1.5 | | |
| Calcined alumina | 13 | 9.5 | 8 | 19.9 |
| Silica smoke | 5 | 4 | 4 | 10 |
| Powdery epoxy resin | 0.2 | 0.2 | 0.3 | 0.2 |
| Total | 100.0 | 100.0 | 100.0 | 100.0 |

Table 1 also summarizes the results of an adhesion test.

The adhesion test provides the breaking force during a flexural test on 3 assembled filter blocks made from silicon carbide, these blocks presenting external dimensions of 33*33*150 mm, a wall thickness of 0.3 mm and cells or "channels" of 1.8 mm*1.8 mm. These blocks were assembled by means of cement joints of 2 mm in thickness. A drying at 120° C. for 12 h followed the application of the cement.

The chemical analyzes were carried out on samples of cement dried at 120° C. and reduced to powder, which was pre-calcined under air at 750° C. for approximately 0.5 hours, according to the practice of preparation for chemical analysis well known by one skilled in the art. The silicon carbide content was more particularly measured by LECO.

Table 1 shows the beneficial effect of the presence of the thermosetting resin on the adhesion between the unit blocks.

In addition, filters were produced with the cements whose formulations appear in table 1. These filters did not show significant differences in thermomechanical resistance.

Of course, the present invention is not limited to the described embodiments, provided on a purely illustrative and non-restrictive way.

In particular, the presence of clay or ceramic fibers is not excluded. The cement according to the invention can also contain water-soluble fibers.

The cement according to the invention can be used not only to form a joint 27 for assembling filter blocks, but also to form a peripheral joint 28.

The invention claimed is:

1. A cement intended in particular for fastening together a plurality of filter blocks of a filtering body of an exhaust gas particle filter of an internal combustion engine of a motor vehicle, or to be used as a peripheral coating for such a filtering body, said cement comprising a silicon carbide content of more than 60% and 90% or less, and comprising at least 0.05% and less than 1% of a thermosetting resin, the percentages being percentages by weight relative to the total weight of the thermosetting resin and the mineral material, apart from the possible water, said cement further comprising alumina and silica, the silicon carbide, alumina and silica representing in total at least 95% of the total weight of the thermosetting resin and the mineral material, apart from the possible water, said cement not containing ceramic fibers.

2. The cement according to claim 1, wherein the thermosetting resin is selected among epoxy, silicone, polyimide, phenolic and polyester resins.

3. The cement according to claim 1, comprising between 0.1 and 0.5% in weight of a dispersant, in percentage by weight relative to the total weight of the thermosetting resin and the mineral material, apart from the possible water.

4. The cement according to claim 1, having a CaO content of less than 0.5%, in percentage by weight relative to the total weight of the thermosetting resin and the mineral material, apart from the possible water.

5. The cement according to claim 1, having a water content of less than 40% and at least 10%, in percentage by weight relative to the total weight of the thermosetting resin and the mineral material, apart from the water.

6. A filtering body, in particular for an exhaust gas particle filter of an internal combustion engine of a motor vehicle, comprising a plurality of filter blocks fastened together by means of at least one joint inserted between said filter blocks, and shaped so as to oppose to the passage of said exhaust gases between said filter blocks, wherein the joint is obtained by the hardening of a cement according to claim 1, and/or the filtering body comprises a peripheral coating (27'), obtained by heat treatment of the cement.

7. The filtering body according to claim 6, wherein the assembled filter blocks comprise at least 50% of silicon carbide.

8. A single-block filtering body, in particular for an exhaust gas particle filter of an internal combustion engine of a motor vehicle, comprising a peripheral coating (27') obtained by heat treatment of a cement according to claim 1.

9. The cement according to claim 1, wherein silicon carbide is added as a granular mixture having grain sizes in a range between 0 and 0.5 mm to prepare said cement.

* * * * *

UNITED STATES PATENT AND TRADEMARK OFFICE
CERTIFICATE OF CORRECTION

PATENT NO.        : 8,398,736 B2                                    Page 1 of 1
APPLICATION NO. : 12/304146
DATED             : March 19, 2013
INVENTOR(S)       : Bardon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 926 days.

Signed and Sealed this

First Day of September, 2015

Michelle K. Lee
*Director of the United States Patent and Trademark Office*